Figure 1:
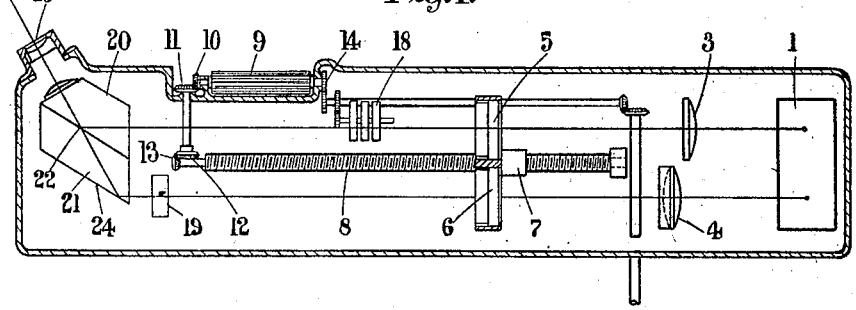

June 10, 1924.  
J. M. STRANG  
1,496,954

OPTICAL APPARATUS FOR MEASURING SMALL ANGLES IN A HORIZONTAL PLANE

Filed April 25, 1922      2 Sheets-Sheet 1

INVENTOR.
John Martin Strang,
By J. Walter Fowler
Attorney.

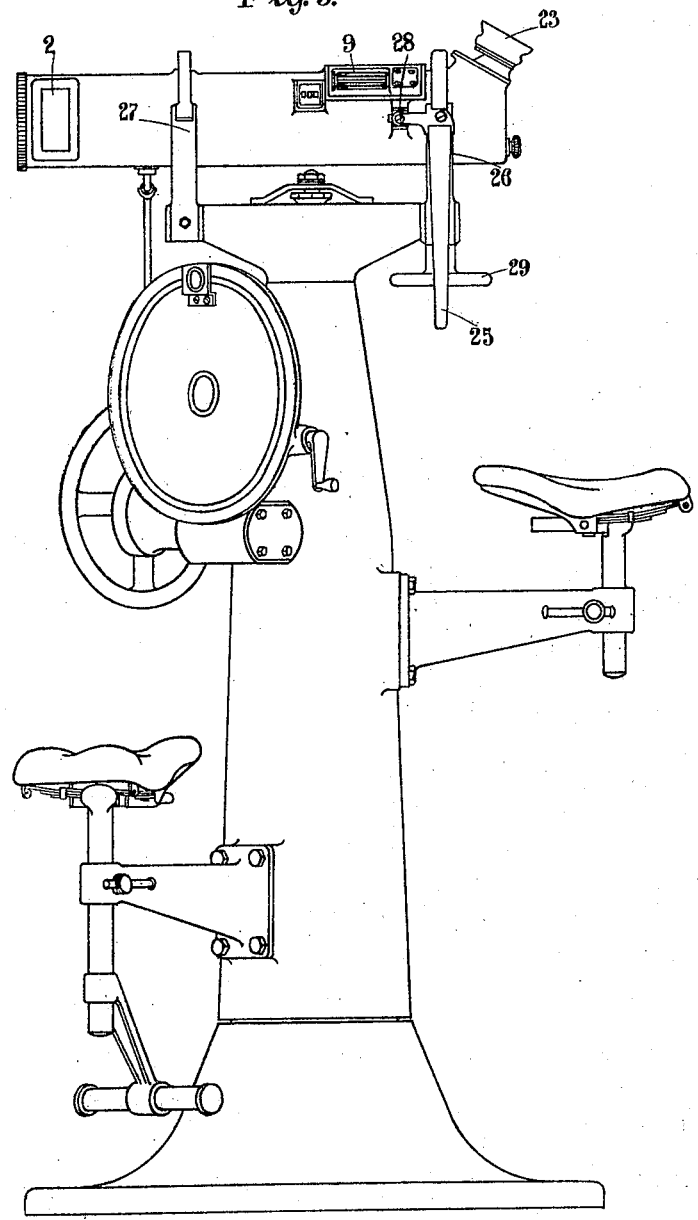

Patented June 10, 1924.

1,496,954

UNITED STATES PATENT OFFICE.

JOHN MARTIN STRANG, OF ANNIESLAND, GLASGOW, SCOTLAND, ASSIGNOR TO BARR AND STROUD, LIMITED, OF GLASGOW, SCOTLAND.

OPTICAL APPARATUS FOR MEASURING SMALL ANGLES IN A HORIZONTAL PLANE.

Application filed April 25, 1922. Serial No. 556,427.

*To all whom it may concern:*

Be it known that I, JOHN MARTIN STRANG, a subject of the King of Great Britain and Ireland, and of Caxton Street, Anniesland, Glasgow, Scotland, have invented new and useful Improvements in Optical Apparatus for Measuring Small Angles in a Horizontal Plane, of which the following is a specification.

The object of my invention is to provide improved optical means of measuring small angles in a plane horizontal or approximately so hereinafter referred to generally as a horizontal plane. The present invention is specially applicable to the determination of the angle subtended by the length L of an enemy ship (or the distance between two prominent marks such as two masts). It furnishes means for the rapid detection of a change of course on the part of the enemy, and when L is known or assumed and the range has been determined, this angular measurement furnishes data for the calculation of the course of the enemy.

Optical apparatus according to this invention affords comfort in use to the observer and comprises two telescope systems of the prismatic type having an entrance prism system, optical means for producing relative displacement of the images formed by the telescopes, for example, by displacing one or both of the two images formed by the telescopes, and an image combining prism system associated with an eyepiece, the optical axes of the two telescope systems (in the normal position for use) being each horizontal, the optical axis of the eyepiece being inclined downwards to the horizontal, the optical axes of the two telescope systems and the axis of the eyepiece being perpendicular or thereabouts to the line of sight to the target, hereinafter referred to generally as perpendicular, from which beams are reflected at right angles in a horizontal plane into the telescopes by the entrance prism system.

The instrument may be constructed to produce separated images in the field of view or the images produced may be arranged to overlap, the images in either case being formed in or near the focal plane (hereinafter referred to generally as in the region of the focal plane) of the eyepiece. In cases where two separate images are formed the line of separation would be arranged horizontally.

In instruments according to my invention the beam of light from the target is in each telescope system first reflected at right angles (or approximately so) in a horizontal plane. It then passes along the instrument parallel to the axis of rotation in altitude of the instrument and is reflected in a vertical plane, the reflection being so arranged that the observer looks down at a comfortable angle of, say, 45° or 60° to see the image.

An example of construction will now be described with reference to the accompanying drawings, in which:—

Figure 2:
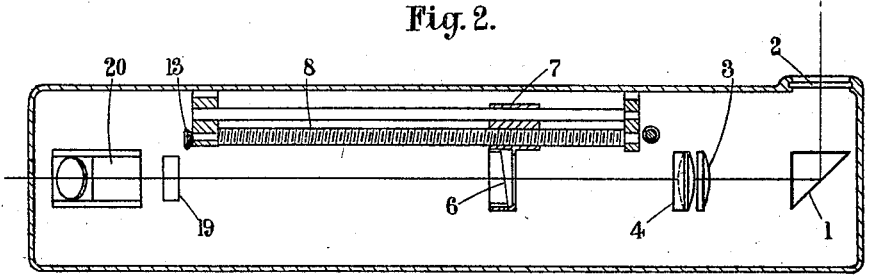

Figure 1 is a vertical sectional elevation through the longitudinal axis of the instrument. Figure 2 is a sectional plan of the instrument. Figure 3 is a view of the instrument on a mounting.

In this instrument horizontal beams of light, after traversing a window 2 are reflected in a horizontal plane by an entrance prism system, which is used for the first reflection of both beams. In this case, a single entrance prism 1 is used, which has the advantage that any small motion of the entrance prism effects the two beams equally. Alternatively two prisms might be used, one for each telescope, preferably mounted in a common carrier. The upper beam then passes through objective 3, while the lower passes through objective 4. The objective 4 comprises two lenses which are capable of adjustment by separation so as to secure equal magnification in the two telescope systems. The beams next traverse respectively refracting prisms 5 and 6. These prisms may be mounted together in a holder carried by a nut 7 upon a screw 8 operated by a working head 9 through bevel wheels 10 and 11, 12 and 13. Upon the shaft of the working head 9 is fixed a pinion 14 operating counter drums 18 through pinion gearing. In this case the value of the angle is read by a separate observer. It will be obvious that instead of the counter drums 18 we may use any known system for indicating rotations and partial rotations of the screw 8. A plane parallel glass 19 is provided for effecting the adjustment of "halving," as is well known in connection with coincidence rangefinders. For setting the instrument to measure zero angle as the two prisms 5 and 6 can never be brought to within some little distance of the separating line, I may provide an additional deviating prism (not shown in the drawing) in one of the telescope systems or one in each telescope system, so as to give the zero position when the carrier of the two prisms 5 and 6 is suitably placed. The upper beam of light, after traversing the refracting prism 5 enters a prism 20 of an image combining prism system. The lower beam, after traversing the refracting prism 6 and the halving glass 19, enters prism 21 of the image combining prism system. The prism 20 may be coated with silver over a portion of its surface (say the lower part), terminating in a cleanly cut edge 22. The optical parts are so arranged that images of the object are formed by the two telescope systems in the plane of the edge of the silvering. Of the image formed by the telescope system 3, 5, 20, only that part which falls below the edge 22 will be reflected so as to be seen through the eyepiece 23, and of the image formed by the telescope system 4, 6, 19, 21, only that portion which falls above the edge 22 will be seen through the eyepiece 23. In the field of view of the eyepiece will thus be seen two partial images of the object viewed, the edge 22 of the silvering forming a separating line between the partial images in a manner similar to that in use in coincidence rangefinders. The upper part of the prism 20 could evidently be silvered instead of the lower part. Instead of silvering one half (more or less) of the prism 20, a narrow horizontal strip of silvering may be formed, say, at 22 on the reflecting face of prism 20, and the images of the object viewed, formed by the two telescope systems, may be focussed accurately in the plane of one of the edges of the strip, but if the strip is narrow both edges may be virtually in the focal plane of the images. The upper beam is then reflected from the strip, while the lower beam is reflected from face 24 of prism 21 and, after passing above and below the strip 22, enters the eyepiece 23. In the field of view of the eyepiece 23 I thus have an inset field formed by the telescope 3, 5, 20, extending across or surrounded by a field formed by the telescope 4, 6, 19, 21. Instead of providing a narrow strip of silver on the lower face of the prism 20, I may silver the whole of the lower face of prism 20 except a narrow band of clear glass at 22, in which case I again have one partial image formed by one of the telescope systems (in this case the lower telescope) inserted in a field produced by the other telescope system (in this case the upper telescope).

The use of such a strip field is known in connection with coincidence rangefinders.

In the operation of the instrument, the working head 9 is rotated, say, by the right hand of the observer, until the image of one end of the length L as given by one of the telescope systems is seen in coincidence with the image of the other end of the length L as formed by the other telescope system, when the scale drums, if properly graduated, will indicate the angle subtended at the instrument by the length L in any chosen unit, for example, in minutes of angle or as a ratio of the length L to the distance from the instrument of the object furnishing the length L. Suitable means, such as those well known in connection with coincidence rangefinders, may be provided in the instrument for effecting the adjustment corresponding to that of "coincidence" provided for in well known forms of coincidence rangefinders.

As shown in Figure 3 the instrument may be supported on a mounting and arranged capable of angular movement about an axis parallel with the axes of the telescopes. In this case the mounting comprises an altitude handle 25 for rotating the instrument about trunnions 26 and 27 through a pin 28. The handle 25 is arranged to work in a vertical plane perpendicular to the line of sight, and therefore the motion of the handle conveys the same impression to the observer as if he were looking into an instrument in the direction of the object and rotating the instrument in altitude directly. The handle 25 is controlled by the observer's left hand, which may be steadied on a guide 29.

I claim—:

1. Optical apparatus comprising two telescope systems of the prismatic type, an eyepiece common to the double telescope system, the optical axes of the two telescopes (in the normal position for use) being each horizontal and perpendicular to the line of sight to the target, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, for the purposes set forth.

2. Optical apparatus comprising two telescope systems of the prismatic type, an eyepiece common to the double telescope system, the optical axes of the two telescopes (in the normal position for use) being each horizontal and perpendicular to the line of sight to the target and in the same vertical plane, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, for the purposes set forth.

3. Optical apparatus comprising two telescope systems of the prismatic type, an eyepiece common to the double telescope system, the optical axes of the two telescopes (in the normal position for use) being each horizontal and perpendicular to the line of sight to the target and in the same vertical plane, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, an upper field furnished by one telescope and a lower field furnished by the other telescope, each in the region of the focal plane of the eyepiece to enable observations to be made on the coincidence principle, means in the double telescope system for producing coincidence and means for indicating the angle ascertained, for the purposes set forth.

4. Optical apparatus comprising two telescope systems of the prismatic type, an eyepiece common to the double telescope system, the optical axes of the two telescopes (in the normal position for use) being each horizontal and perpendicular to the line of sight to the target and the optical axis of the eyepiece being in a plane perpendicular to the line of sight to the target and inclined downwards at an angle to the horizontal, the double telescope system comprising a single entrance prism by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, for the purposes set forth.

5. Optical apparatus comprising two telescope systems of the prismatic type, an eyepiece common to the double telescope system, the optical axes of the two telescopes (in the normal position for use) being each horizontal and perpendicular to the line of sight to the target and in the same vertical plane, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system consisting of two prisms arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, for the purposes set forth.

6. Optical apparatus comprising two telescope systems of the prismatic type, an eyepiece common to the double telescope system, the optical axes of the two telescopes (in the normal position for use) being each horizontal and perpendicular to the line of sight to the target and the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, a movable refracting prism in the double telescope system for producing coincidence and means for indicating the movement of the refracting prism, for the purposes set forth.

7. Optical apparatus comprising two telescope systems of the prismatic type, an eyepiece common to the double telescope system, the optical axes of the two telescopes (in the normal position for use) being each horizontal and perpendicular to the line of sight to the target and the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, a translatable refracting prism in the double telescope system for producing coincidence and means for indicating the translation of the refracting prism, for the purposes set forth.

8. Optical apparatus comprising two telescope systems of the prismatic type, an eyepiece common to the double telescope system, the optical axes of the two telescopes (in the normal position for use) being each horizontal and perpendicular to the line of sight to the target, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, and an image combining prism system arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, a mounting for supporting the apparatus so that it is capable of rotation in altitude about a horizontal axis perpendicular to the line of sight to the target, for the purposes set forth.

9. Optical apparatus comprising two telescope systems of the prismatic type, an eyepiece common to the double telescope system, the optical axes of the two telescopes (in the normal position for use) being each horizontal and perpendicular to the line of sight to the target, the optical axis of the eyepiece being in a plane perpendicular to the line of sight to the target and inclined downwards at an angle to the horizontal, the double telescope system comprising an image combining prism system by which the beams of light from the target are reflected at right angles in a horizontal plane, and an eyepiece prism system arranged opposite the eyepiece by which the beams are reflected in a vertical plane and caused to present two fields of view, each in the region of the focal plane of the eyepiece to enable observations to be made on the coincidence principle, means in the double telescope system for producing coincidence and means for indicating the angle ascertained, a mounting for supporting the apparatus so that it is capable of rotation in altitude about a horizontal axis perpendicular to the line of sight to the target, a lever system for controlling the apparatus in altitude having a handle movable in a plane perpendicular to the line of sight to the target, for the purposes set forth.

10. Optical apparatus comprising two telescope systems of the prismatic type, an eyepiece common to the double telescope system, the optical axes of the two telescopes (in the normal position for use) being each horizontal and perpendicular to the line of sight to the target and in the same vertical plane, the optical axis of the eyepiece being in a plane perpendicular to the line of sight to the target and inclined downwards at an angle to the horizontal, the double telescope system comprising an entrance prism system by which the beams of light from the target are reflected at right angles in a horizontal plane, objectives one in each telescope, axially translatable prisms one in each telescope, and an image combining prism system arranged opposite the eyepiece by which the beams are reflected in the vertical plane and caused to present two fields of view, each in the region of the focal plane of the eyepiece to enable observations to be made on the coincidence principle, and means for indicating the angle ascertained, for the purposes set forth.

JOHN MARTIN STRANG.